United States Patent [19]
Spallek et al.

[11] Patent Number: 6,156,399
[45] Date of Patent: *Dec. 5, 2000

[54] GLASS CONTAINERS WHICH MAY BE STERILIZED FOR MEDICAL PURPOSES, IN PARTICULAR FOR THE STORAGE OF PHARMACEUTICAL OR DIAGNOSTIC PRODUCTS

[75] Inventors: Michael Spallek, Ingelheim; Marten Walther, Englestadt; Andreas Geiger, Beinde, all of Germany

[73] Assignee: Schott Glaswerke, Mainz, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/023,283

[22] Filed: Feb. 13, 1998

[30] Foreign Application Priority Data

Feb. 18, 1997 [DE] Germany ............................ 197 06 255

[51] Int. Cl.[7] ............................ B32B 17/06; A61B 19/00
[52] U.S. Cl. ......................... 428/34.6; 428/428; 428/432; 604/19; 604/403; 604/411; 604/415; 427/237; 427/576; 427/579
[58] Field of Search ................................. 428/36.4, 428, 428/432, 34.6; 604/403, 411, 415, 19–21; 427/578, 579, 526, 585, 237

[56] References Cited

U.S. PATENT DOCUMENTS 3,499,775 3/1970 Albinak et al. ........................... 106/47
3,833,406 9/1974 White ....................................... 117/97
4,397,897 8/1983 Schulke .................................. 428/34.6
5,900,285 5/1999 Walther et al. ......................... 427/491

FOREIGN PATENT DOCUMENTS 2 697 014  4/1994  France .
296 09 958 U  8/1996  Germany .
1036564  2/1986  Japan .

OTHER PUBLICATIONS

European Search Report mailed Jun. 29, 1998.

Derwent Publications Ltd., London, GB; AN 92–312903 XP002065522 & JP 04 219 343 A (Nippon Electric Glass Co).

Derwent Publications Ltd., London, GB; AN 79–75931B XP002065523 & JP 54 113 618 A (Toshiba Kasei Kogyo).

*Primary Examiner*—Rena L. Dye
*Attorney, Agent, or Firm*—Kilpatrick Stockton LLP; George Marcou

[57] ABSTRACT

The invention is a glass container which can be sterilized for medical purposes, including the storage of pharmaceutical or diagnostic products, further including solutions. The container is made from glass containing a stabilizer which inhibits the deleterious effects of high energy radiation, wherein the surface which is in direct contact with the product or solution has a coating that has a thickness of less than 400 nm and is formed from oxides or nitrides of the elements Si, Ti, Ta, Al or a mixture thereof.

9 Claims, 1 Drawing Sheet

GLASS CONTAINERS WHICH MAY BE STERILIZED FOR MEDICAL PURPOSES, IN PARTICULAR FOR THE STORAGE OF PHARMACEUTICAL OR DIAGNOSTIC PRODUCTS

BACKGROUND OF INVENTION

The invention relates to glass containers which can be sterilized for medical purposes, in particular for the storage of pharmaceutical or diagnostic products, including solutions. Such containers are intended to come into direct contact with their contents. A varied selection of glass containers are used, for example, small bottles (described in detail in, for example, the ISO norm 8362, section 1), ampoules (described in detail in, for example, the ISO norm 9187, section 1), syringe bodies (described in detail in, for example, the ISO norm 11040, section 4), glass cylinders (described in detail in, for example, the ISO norm 13926, section 1), as well as bottles (described in detail in, for example, the ISO norm 8356, section 1). The filling volume of these types of containers varies from 0.5 to 2000 ml.

For these purposes, for example, for the packaging of injection solutions, glasses with a high hydraulic resistance are necessary (in accordance with the pharmacopoeia, for example, the German Pharmacopoeia DAB 10, glass of the type I or II). Examples of glass containers which fulfill this demand are disclosed in the German utility model DE 296 09 958.U1 which describes glass containers whose surfaces are in contact with the solutions and are have a coating of oxides and/or nitrides of the elements Si, Ti, Ta, Al by way of a plasma chemical vapor deposition (CVD) procedure.

For a vast number of medical and pharmaceutical uses, it is necessary to sterilize the empty containers before filling them. Sterilization methods suitable for glass containers at the moment involve costly technical chemical procedures such as fumigation with ethylene oxide, autoclaving with overheated water vapor and heat sterilization at temperatures of between 250 and 300° C. There is a great need for the improvement of these containers and in their associated methods of use.

Further methods of sterilization using high energy radiation (for example β-radiation, γ-radiation and strong UV-radiation) are not suitable in this case since current glasses, for example, common borosilicate glasses or soda-lime silica glasses, will discolor heterogeneously yellow to brown, often in a spotty manner after the sterilization due to the high energy radiation, depending on the radiation dose. Such discoloration varies depending on time, temperature and the influence of light. Accordingly, it is frequently impossible to render a dependable visual inspection of the contents.

The examination of, for example, a powdery content, for foreign particles would not be dependable in a heterogeneously (spotty) discolored container. Given the high degree of automation in production lines today, any noticeable deviation from a pre-determined norm would lead to a sorting out of the container in question and could possibly even lead to a halt of an entire production line.

The use of high energy radiation for sterilization can also be advantageous for previously filled containers. In this case, also, a discoloration of the container is unacceptable since it would gravely limit the ability of the pharmaceutical producer, the pharmacist, and the user to monitor or control the content. For the consumer, it is important that, for example, two containers which contain the same product are visually identical since otherwise it would be very difficult to clearly identify the container which may contain a spoiled product.

The addition of stabilizers, in particular, cerium (Ce), has long been known in glass chemistry to suppress the brown discoloration caused by high energy radiation. However, cerium containing glasses have not been suitable for use as containers for storage of pharmaceutical and diagnostic solution since Ce-ions could be released into the solution during storage and other glass components, such as $SiO_2$, $Al_2O_3$, etc., are released after the radiation to a greater extent than in non-irradiated containers. The interaction of the content with the diffused Ce-ions could be critical or, in other words, could gravely influence the effectiveness of the medicine. Accordingly, the contents of every container would have to be examined under varying storage conditions and times. This would entail immense testing expenditure.

SUMMARY OF INVENTION

The purpose of the invention is to create a glass container for the storage of pharmaceutical or diagnostic solutions which can be sterilized by using high energy radiation, while avoiding any noticeable discoloration and to a great extent remaining inert relative to the contained product or solution.

In such glass containers the surface which is in contact with the contained product or solution is coated with oxide and/or nitrides of the elements Si, Ti, Ta, Al or with mixtures, thereof. The containers are characterized by the fact that they contain a stabilizer which inhibits the deleterious effects of high energy radiation. The coatings are less than 400 nm thick.

DETAILED DESCRIPTION OF THE PREFERRED EMBODIMENTS

Figure 1:
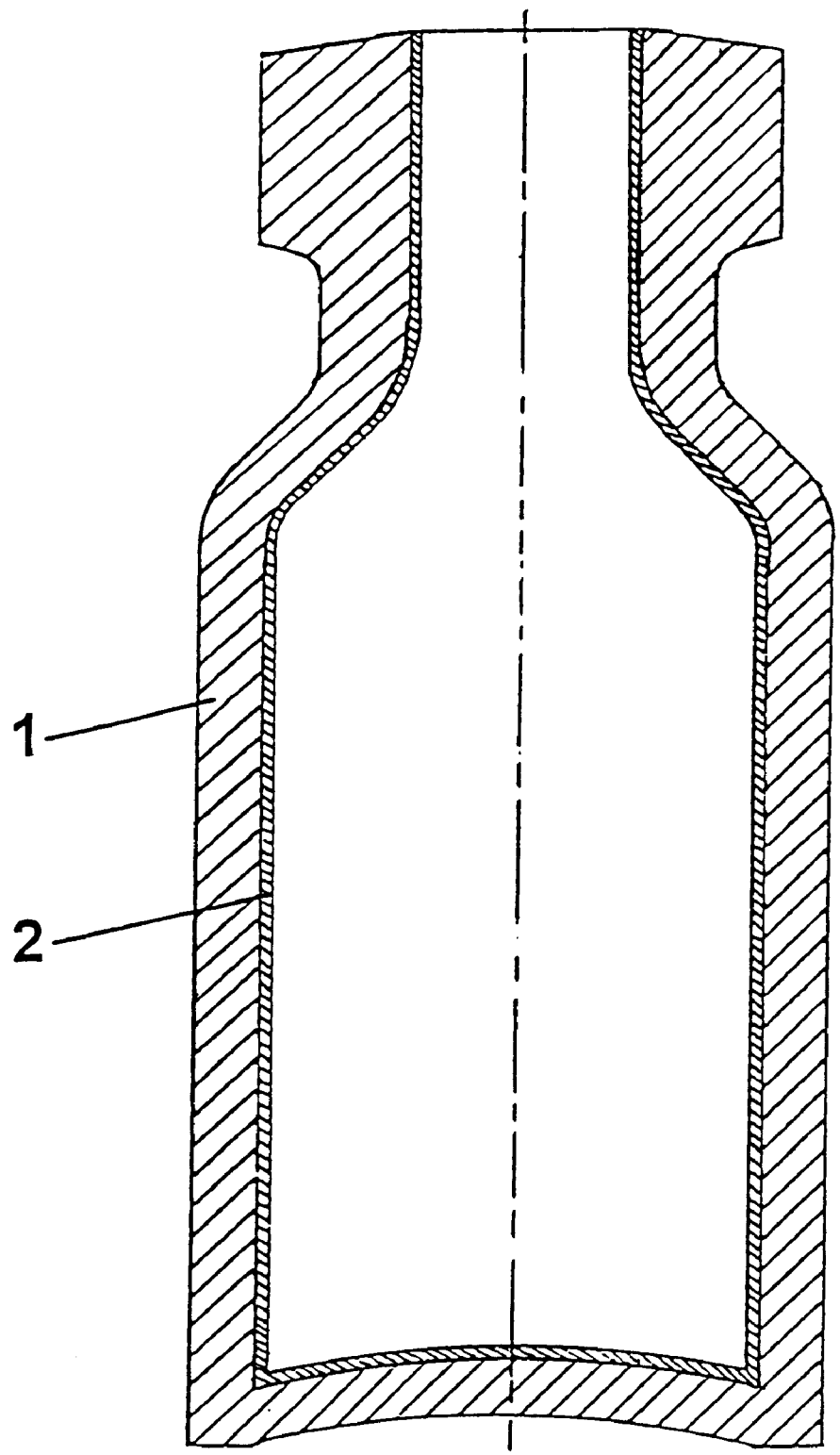
FIG. 1 illustrates an injection bottle having a body and inner coating.

The constituent container glass includes a stabilizer which inhibits the deleterious effects of high energy radiation or, in other words, a stabilizer which prevents the discoloration caused by such radiation. These stabilizers can, for example, be oxides of lanthanide, such as cerium, which can exist in several valencey states.

The glasses commonly used for pharmaceutical purposes could be used. The use of glasses which show high hydraulic resistance are preferable, such as the so-called neutral glasses (borosilicate glasses) (DAB 10, glass type I). However, soda-lime silica glasses could also be used which in the uncoated state correspond to glass type III (DAB).

The invention concerns not only clear containers but also colored containers. Additional and or uneven discoloration due to the high energy radiation on, for example, brown colored glass utilized for light sensitive substances is equally undesired.

The preferred stabilizer is cerium which should preferably be present in the glass in an amount of 0.3 to 1.5% by weight. This minimum amount assures a sufficient effect. Levels higher than 1.5% by weight are usually aesthetically undesirable due to the then noticeable color caused by the cerium and are not necessary to be effective. A content in the range of 0.5 to 1.5% by weight is preferable.

FIG. 1 is a cross-sectional view of a glass container 1. The inside wall 2 of the glass container or, in other words, the wall which is in contact with the product or solution, is coated with oxides and/or nitrides of the elements Si, Ti, Al or mixtures, thereof.

It is preferable that the coating be achieved using a plasma CVD process (PCVD) or, in particular, plasma impulse chemical vapor deposition (PICVD). During the selected process, a coating deposition occurs from the vapor phase, which allows the energy needed for the fission of the precursor vapor to be inputted into the system through an electric high frequency plasma. This process is well known. Coatings produced using this process are particularly resistant to the release of ions into the product or solution upon the onset of high energy radiation.

Oxide coatings are particularly well suited, in particular, those made from $SiO_2$ and/or $TiO_2$, with $SiO_2$ being preferred.

The coating must not be thicker than 400 mm since it does not contain cerium and can be discolored by the high energy radiation, this thickness is lesser than the wavelengths of visible light but is not visible to the naked eye. Preferably the coatings are between 10 and 200 nm. Several coatings with different contents as a coating package can be produced. Accordingly, the coating package should then have the thickness as described above.

Such a coating has a remarkable blocking effect against the release of ions from the glass through the product or solution and particularly against the release of Ce-ions, which is an important aspect of this invention.

The following glass containers are preferable: 1) small injection bottles, 2) syringe bodies, 3) glass cylinders or 4) injection bottles. The specific characteristics of the glass container of the invention are shown in the following examples of coated glass bottles. Glass bottles according to ISO 8362, section I, with a bottle size of 6R were used.

Table 1 is an overview of the examined glass compositions. Glasses 1–6 are soda-lime silica glasses, while glasses 7–14 are borosilicate glasses. Glasses 1 and 7 do not contain a stabilizer against high energy radiation and serve as comparison.

side by the PICVD process were radiated with various doses of energy and examined for discoloration. The inspection was both visual and by transmitted light. Such testing for discoloration took place three (3) weeks after the radiation.

The results summarized in Table 2 show that the coated and irradiated containers which contained 0.3% or more cerium by weight showed little or no discoloration. Accordingly, the above mentioned compositional variations did not have a deleterious effect. The transmission values of the coated and irradiated small bottles varied only slightly from the coated and non-irradiated small bottles.

Both coated and uncoated bottles of selected compositions, according to Table 1, were irradiated with various amounts of energy. They were then filled with twice distilled water and autoclaved for 60 min. at 121° C. Finally the amount of released silicon ions and cerium ions were determined in units of $\mu g/ml$. The results are summarized in Table 3. The ion concentration was determined by using atomic absorption spectrometry. The listed values are averages of between 5–7 individual determinations. All concentrations are determined according to each oxide and are stated in $\mu g/ml$ (ppm).

The results listed in Table 3 show that the coating functions as an excellent inhibitor against the release of the referenced ions. Moreover, the function and effect of the coating is not adversely affected by radiation, in contrast to the high release rate of Ce-ions and Si-ions in the uncoated containers, which was further increased

TABLE 1

Employed Glass Compositions (weight %) (*)

| Glass | $SiO_2$ | $B_2O_3$ | $Al_2O_3$ | $Na_2O$ | $K_2O$ | MgO | CaO | BaO | $Ce_2O_3$ |
|---|---|---|---|---|---|---|---|---|---|
| 1 | 69 | 1.0 | 4 | 12.5 | 3.5 | 2.5 | 5 | 2 | 0 |
| 2 | 68.7 | 1.0 | 4 | 12.5 | 3.5 | 2.5 | 5 | 2 | 0.3 |
| 3 | 68.5 | 1.0 | 4 | 12.5 | 3.5 | 2.5 | 5 | 2 | 0.5 |
| 4 | 68.2 | 1.0 | 4 | 12.5 | 3.5 | 2.5 | 5 | 2 | 0.8 |
| 5 | 68 | 1.0 | 4 | 12.5 | 3.5 | 2.5 | 5 | 2 | 1.0 |
| 6 | 67.5 | 1.0 | 4 | 12.5 | 3.5 | 2.5 | 5 | 2 | 1.5 |
| 7 | 75 | 11 | 5 | 7 | | | 1.5 | 0.5 | 0 |
| 8 | 74.2 | 11 | 5 | 7 | | | 1.5 | 0.5 | 0.8 |
| 9 | 79.5 | 13 | 2.5 | 3.5 | 0.5 | | | | 0.5 |
| 10 | 70.5 | 8 | 5.5 | 7 | 1.5 | | 1 | 2 | 0.3 |
| 11 | 70 | 8 | 5.5 | 7 | 1.5 | | 0.5 | 2 | 0.8 |
| 12 | 72 | 11 | 7 | 7 | 1 | | 1 | | 0.8 |
| 13 | 72.5 | 10 | 6 | 6 | 3 | | 0.5 | | 0.8 |
| 14 | 73.5 | 10 | 6 | 8 | 1 | | | | 0.8 |

(*) Remainder up to 100% = other elements (in numbers 10 and 11 combined additional amounts of $Fe_2O_3$ and $TiO_2$ equal 3.5%)

Small glass bottles of the listed compositions which had a 100 nm-150 nm thick $SiO_2$ coating applied to the inner

TABLE 2

Color change of coated small glass bottles depending on glass composition (see Table 1) and the radiation dose.

| Gals no. | 1 | 2 | 3 | 4 | 4 | 5 | 6 | 7 | 8 | 9 | 10 | 11 | 12 | 13 | 14 |
|---|---|---|---|---|---|---|---|---|---|---|---|---|---|---|---|
| Ce-oxide content % by weight | 0 | 0.3 | 0.5 | 0.8 | 0.8 | 1 | 1.5 | 0 | 0.8 | 0.5 | 0.3 | 0.8 | 0.8 | 0.8 | 0.8 |

TABLE 2-continued

Color change of coated small glass bottles depending on glass composition (see Table 1) and the radiation dose.

| Gals no. | 1 | 2 | 3 | 4 | 4 | 5 | 6 | 7 | 8 | 9 | 10 | 11 | 12 | 13 | 14 |
|---|---|---|---|---|---|---|---|---|---|---|---|---|---|---|---|
| Radiation dose [kGy] | 25 | 25 | 25 | 25 | 35 | 35 | 35 | 25 | 25-35 | 25 | 35 | 35 | 35 | 35 | 25 |
| Color before radiation | Colorless | Colorless | Colorless | Colorless | Colorless | Colorless | Colorless | Colorless | Colorless | Colorless | Brown | Brown | Colorless | Colorless | Colorless |
| Color change after radiation | Yes strongly | Yes lightly | No | No | Mildly | No | No | Yes strongly | No | No | Yes mildly | No | No | No | No |

TABLE 3

Elute concentrations for coated and un-coated, radiated and non-radiated glasses of selected compositions (see table 1)

| Glass no. | $Ce_2O_3$ content % by weight | Coating 100–150 nm $SiO_2$ with PICVD | Radiation dose | Elute concentration [μg/ml] $SiO_2$ | $Ce_2O_3$ |
|---|---|---|---|---|---|
| 1 | 0 | yes | 0 | <0.3 | — |
| 1 | 0 | yes | 25 | <0.3 | — |
| 1 | 0 | no | 0 | 9.4 | — |
| 1 | 0 | no | 25 | 10.8 | — |
| 4 | 0.8 | yes | 0 | <0.3 | <0.05 |
| 4 | 0.8 | yes | 35 | <0.3 | <0.05 |
| 4 | 0.8 | no | 0 | 9.6 | 2.6 |
| 4 | 0.8 | no | 35 | 11.8 | 3.0 |
| 7 | 0 | yes | 0 | <0.3 | — |
| 7 | 0 | yes | 25 | <0.3 | — |
| 7 | 0 | no | 0 | 4.4 | — |
| 7 | 0 | no | 25 | 5.6 | — |
| 8 | 0.8 | yes | 0 | <0.3 | <0.05 |
| 8 | 0.8 | yes | 35 | <0.3 | <0.05 |
| 8 | 0.8 | no | 0 | 4.4 | 2.1 |
| 8 | 0.8 | no | 35 | 5.6 | 2.4 |
| 12 | 0.8 | yes | 0 | <0.3 | <0.05 |
| 12 | 0.8 | yes | 35 | <0.3 | <0.05 |
| 12 | 0.8 | no | 0 | 6.1 | 2.9 |
| 12 | 0.8 | no | 35 | 7.6 | 3.1 |
| 13 | 0.8 | yes | 0 | <0.3 | <0.05 |
| 13 | 0.8 | yes | 35 | <0.3 | <0.05 |
| 13 | 0.8 | no | 0 | 3.7 | 1.8 |
| 13 | 0.8 | no | 35 | 5.0 | 2.3 |
| 14 | 0.8 | yes | 0 | <0.3 | <0.05 |
| 14 | 0.8 | yes | 0.25 | <0.3 | <0.05 |
| 14 | 0.8 | no | 0 | 5.1 | 2.5 |
| 14 | 0.8 | no | 0.25 | 5.2 | 3.4 |

Limits of detection were: $SiO_2$: 0.3 μg/ml
$Ce_2O_3$: 0.05 μg/ml
—: not examined The coated containers made from glasses 1–6 were soda-lime silica glasses and correspond to the specifications of glass containers of type II in accordance with the German Pharmacopoeia (DAAB 10). Radiation sterilization may also be used for borosilicate glasses without any discoloration or changes in color, nor any release (elute) of Ce-ions after autoclaving. The coated containers from glasses 7–14 were made of borosilicate and correspond to the specifications of glass containers of type I in accordance with the German Pharmacopoeia (DAB 10).

The illustration in FIG. 1, for example, shows a 10 ml injection bottle. The small bottle consists of a cerium containing body 1 and the inner $SiO_2$ coating 2. The thickness of the $SiO_2$ coating is illustrated to scale.

The invented glass container may be sterilized with the commonly used doses (25 to 35 kGy) without any visible discoloration and complies with or exceeds the requirements of DAB and the European Pharmacopoeia for containers made from glass type II.

The new type of combination of well known independent characteristics in the invention provides, with impressive ease, a radiation sterilized and amazingly inert glass container with no interfering discoloration for the storage of pharmaceutical and diagnostic products.

What is claimed is:

1. A glass container that can be sterilized for medical purposes wherein the container comprises:

a surface which is to be in contact with a medical product, wherein the surface further comprises a coating; wherein the coating is 1 to 400 nm in thickness and wherein the coating comprises at least one member of the group consisting of an oxide of Si, an oxide of Ti, an oxide of Ta, an oxide of Al, a nitride of Si, a nitride of Ti, a nitride of Ta, and a nitride of Al; and a stabilizer for use in inhibiting the discoloring effects of high energy radiation.

2. The glass container according to claim 1 wherein the stabilizer is a lanthanide oxide.

3. The glass container according to claim 1 wherein the stabilizer comprises cerium.

4. The glass container according to claim 1 wherein the stabilizer is present in the glass in the amount of 0.3–1.5% by weight.

5. The glass container according to claim 1 wherein the coating is 10–200 nm in thickness.

6. The glass container according to claim 1 wherein the coating comprises $SiO_2$.

7. The glass container according to claim 1 wherein the coating is applied using a plasma chemical vapor deposition process.

8. The glass container according to claim 1 wherein the coating is applied using a plasma impulse chemical vapor deposition process.

9. The glass container according to claim 1 wherein the container is selected from the group comprising an injection bottle, a syringe body, and a glass cylinder.

* * * * *